United States Patent
Komuro et al.

(10) Patent No.: US 8,388,769 B2
(45) Date of Patent: Mar. 5, 2013

(54) POWDERED-IRON MAGNET AND ROTATING MACHINE USING THE SAME

(75) Inventors: Matahiro Komuro, Hitachi (JP); Yuichi Satsu, Hitachi (JP); Takashi Yasuhara, Yotsukaido (JP)

(73) Assignee: Hitachi, Ltd., Tokyo (JP)

( * ) Notice: Subject to any disclaimer, the term of this patent is extended or adjusted under 35 U.S.C. 154(b) by 1054 days.

(21) Appl. No.: 11/641,073

(22) Filed: Dec. 19, 2006

(65) Prior Publication Data

US 2007/0144615 A1      Jun. 28, 2007

(30) Foreign Application Priority Data

Dec. 22, 2005   (JP) .................................. 2005-368993

(51) Int. Cl.
*H01F 1/053*     (2006.01)

(52) U.S. Cl. ......... 148/301; 148/101; 148/103; 148/302

(58) Field of Classification Search .................... None
See application file for complete search history.

(56) References Cited

U.S. PATENT DOCUMENTS

| | | | | |
|---|---|---|---|---|
| 4,834,812 A | * | 5/1989 | Ghandehari | 148/101 |
| 4,954,186 A | * | 9/1990 | Ghandehari | 148/302 |
| 5,015,304 A | * | 5/1991 | Ghandehari | 148/302 |
| 5,316,595 A | * | 5/1994 | Hamada et al. | 148/302 |
| 5,858,124 A | * | 1/1999 | Endo et al. | 148/302 |
| 6,224,986 B1 | * | 5/2001 | Minowa et al. | 428/469 |
| 6,281,774 B1 | * | 8/2001 | Nishiuchi et al. | 335/302 |
| 6,777,097 B2 | * | 8/2004 | Hamada et al. | 428/469 |
| 2005/0284545 A1 | * | 12/2005 | Komuro et al. | 148/302 |
| 2007/0071979 A1 | * | 3/2007 | Komuro et al. | 428/403 |

FOREIGN PATENT DOCUMENTS

| | | |
|---|---|---|
| JP | 55-011339 | 1/1980 |
| JP | 05-006814 | 1/1993 |
| JP | 10-163055 | 6/1998 |
| JP | 2000-034502 | 2/2000 |
| JP | 2003-086414 | 3/2003 |
| JP | 2003-282312 | 10/2003 |

OTHER PUBLICATIONS

Japanese Office Action of Appln. No. 2005-368993 dated Jun. 25, 2010.

* cited by examiner

*Primary Examiner* — John Sheehan
(74) *Attorney, Agent, or Firm* — Antonelli, Terry, Stout & Kraus, LLP.

(57) ABSTRACT

To mold a high-resistance magnet at low temperature, including room temperature, the magnet includes magnetic powders, metallic powders having a lower hardness than the magnetic powders and a high-resistance layer, wherein the magnetic powders occupy a larger volume than the metallic powders. In particular, the high-resistance layer contains a fluorine compound and is placed between the magnetic powder and the metallic powders.

21 Claims, 3 Drawing Sheets

POWDERED-IRON MAGNET AND ROTATING MACHINE USING THE SAME

FIELD OF THE INVENTION

The present invention relates to a rare-earth magnet, a method for producing the same, and a magnetic circuit or rotating machine using the same, in particular a magnet with a high-resistance layer and a method for producing the same.

BACKGROUND OF THE INVENTION

A conventional sintered rare-earth magnet containing a fluorine compound is disclosed in JP-A-2003-282312. The fluorine compound in the document forms the grain boundary phase in the form of the granulation, and the granular particle in the phase has a diameter of several microns. On the other hand, JP-A-2003-86414 discloses a rare-earth magnet of low loss and a method for producing the same, where an oxide, nitride or fluoride powder is selected as a high-resistance material. Each of these prior art documents mixes a magnetic powder of a base phase with a high-resistance material powder, and forms the mixture into a compact. Therefore, it is necessary that the mixture contains the high-resistance material powder at a high content and is molded at a high temperature of 800° C or higher in order to increase resistance of the magnet as a whole.

BRIEF SUMMARY OF THE INVENTION

A NdFeB compact with $Al_2O_3$—$SiO_2$—$Y_2O_3$ of 3% by volume, as disclosed in JP-A-2003-86414 (see Table 3 of the document), exhibits the resistivity of $1\times10^{-4}$ $\Omega$m which corresponds to about 100 times as high as that of the compact without it. At this time, the compact shows high magnetic characteristic, i.e. energy product of 45 MGOe. The Example in the document carries out hot-pressing at 800° C to obtain such a compact. The hot-pressing process which is carried out at such a high temperature needs a process for vacuum evacuation of a molding chamber, a process for purging the chamber with an inert gas for oxidation prevention, a process for heating and cooling, and a process for pressurizing, thereby rising costs of the process in terms of the molding process parameter and time managements. Therefore, although such a hot-processing gives the high magnetic characteristic of 45 MGOe, the high production costs due to the molding process parameter and time management occurs. It is therefore preferable in view of process management to mold a compact at temperature as low as possible, thereby leading to the controlled oxidation during the production processes and the shortened process time. A magnetic powder of an intermetallic compound, which is difficult to deform, is expected to need to be heated at 800° C to obtain a high-density compact. This is the reason why the realization of a low process temperature is difficult.

In the circumstances, it is an object of the present invention to provide a magnet which can be molded at low temperature including room temperature and which has a high resistance.

Other objects, features and advantages of the invention will become apparent from the following description of the embodiments of the invention taken in conjunction with the accompanying drawings.

DESCRIPTION OF REFERENCE NUMERALS

Figure 1:
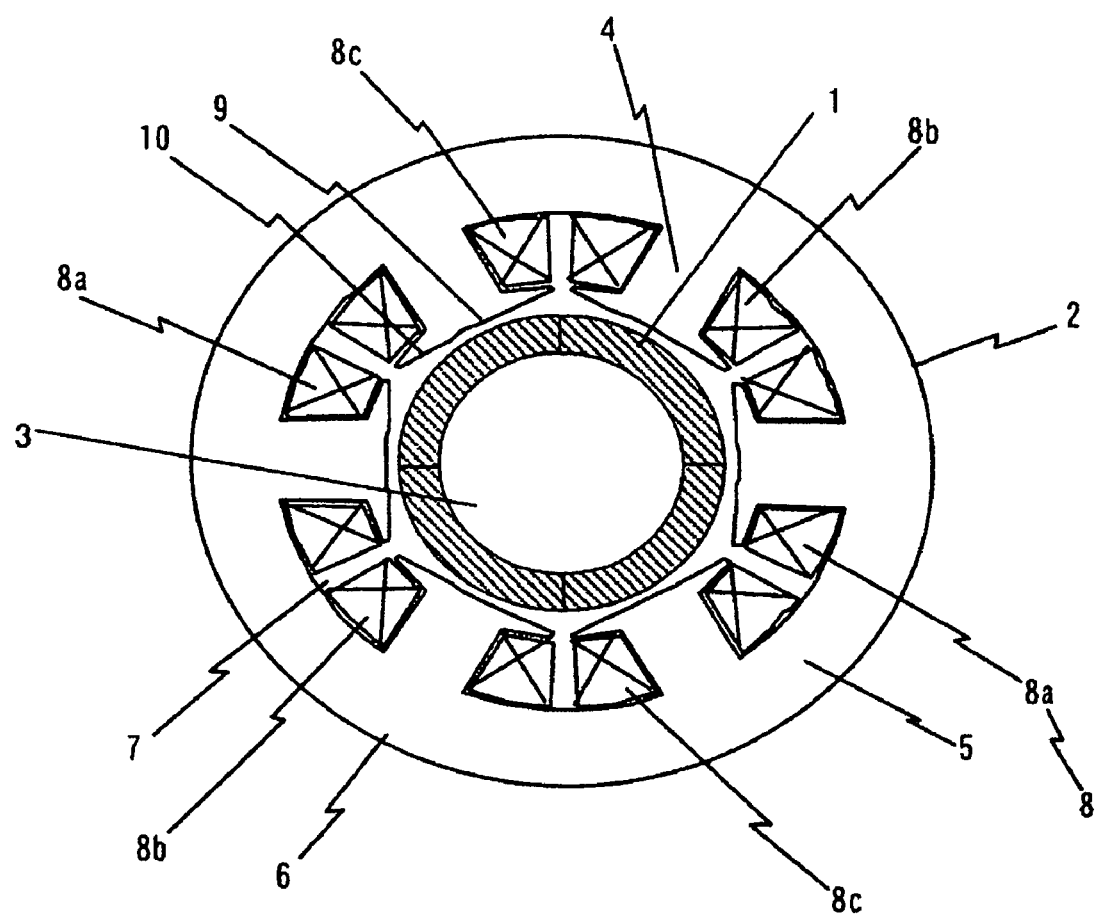
FIG. 1 is a radial cross-sectional view illustrating a motor of powdered-iron magnet.

1: Permanent magnet, 2: Stator, 3: rotator shaft, 4: Teeth, 5: Core back, 6: Stator iron core, 7: Slot, 8: Armature wiring, 9: Shaft hole, 10: Rotator hole, 22: Shaft, 101: Coil, 102: Protective cover, 103: Inverter, 104: Base board, 105: Cooling chamber, 106: Target

DETAILED DESCRIPTION OF THE INVENTION

The magnet of the present invention has a structure including magnetic powders, metallic powders having a lower hardness than the magnetic powder, and a high-resistance layer, wherein the magnetic powders occupy a larger volume than the metallic powders. "Hardness" is measured by the Vickers hardness test. The above metallic powders include Al, Ti, V, Cr, Mn, Fe, Co, Ni, Cu, Zn, Ga, Ge, Zr, Nb, Mo, Ag, In, Sn, Ir, Pt, Au and alloys thereof. These metals and alloys can be easily and largely deformed at room temperature compared with the intermetallic magnetic powders of NdFeB base, SmCo base, SmFeN base and so on. Therefore, the metallic powders are deformed to allow the magnetic powder to be molded into a compact by mixing the above metallic powders and magnetic powders. A high-density compact produced by a mere mixing and molding of the metallic and magnetic powders cannot have a high resistance because of high electric conductivity of the metals. Some of the metals have surfaces oxidized, thereby naturally forming a thin insulating layer. However, since this oxidation surface is easily broken by the deformation, it is difficult to increase the resistance of the compact. It is required that between the metallic and magnetic powders have a high-resistance layer in order to increase the resistance. The high-resistance layer is made of oxide, nitride, fluoride and boride and the powders of these compounds hardly cause the deformation at room temperature or temperature lower than 800° C.

Thus, the metallic and magnetic powders are mixed each other after at least one of them is coated with the high-resistance layer, and then the mixture is molded into a compact. Since the high-resistance layer is made in the form of the layer, the volume fraction of the high-resistance powders can be reduced compared with the case of using the mixing process of high-resistance powders to form the high-resistance layer. Moreover, it is possible to form the compact at from 700° C or low to room temperature. As the molding temperature increases, the volume fraction of the magnetic powder in the mixture increases even in the above temperature range, thereby improving the magnetic characteristics. Of the high-resistance material described above, a fluorine compound can give a more reliable magnet. The fluorine compounds used in the present invention include LiF, $MgF_2$, $CaF_2$, $ScF_3$, $VF_2$, $VF_3$, $CrF_2$, $CrF_3$, $MnF_2$, $MnF_3$, $FeF_2$, $FeF_3$, $CoF_2$, $CoF_3$, $NiF_2$, $ZnF_2$, $AlF_3$, $GaF_3$, $SrF_2$, $YF_3$, $ZrF_3$, $NbF_5$, $AgF$, $InF_3$, $SnF_2$, $SnF_4$, $BaF_2$, $LaF_2$, $LaF_3$, $CeF_2$, $CeF_3$, $PrF_2$, $PrF_3$, $NdF_2$, $NdF_3$, $SmF_2$, $SmF_3$, $EuF_2$, $EuF_3$, $GdF_3$, $TbF_3$, $TbF_4$, $DyF_2$, $DyF_3$, $HoF_2$, $HoF_3$, $ErF_2$, $ErF_3$, $TmF_2$, $TmF_3$, $YbF_3$, $YbgF_2$, $LuF_2$, $LuF_3$, $PbF_2$, $BiF_3$ and a mixture thereof. In addition to this, the fluorine compounds also include oxyfluorides where oxygen binds to the above fluorine compounds, and fluorine compounds containing nitrogen or carbon. In the case of using these fluorine compounds together with the above metal powders, the fluorine compound is not limited so long as the crystal structure of it does not change by the incorporation of the metallic atom used in the above fluorine compounds. These fluorine compounds can be used even when molded by heating together with the metallic powder because they show a high resistance and do not react with the magnetic powders to greatly deteriorate its magnetic characteristics. When the magnetic powder surfaces are coated with a fluoride of rare earth element, the $REF_3$ is grown by the heat treatment at 400° C or lower, and then held at 500 to 800° C under a vacuum of $1 \times 10^{-4}$ Torr or less for 30 minutes. The heat treatment diffuses oxygen in the magnetic powder into the fluorine compounds, simultaneously diffuses the rare-earth element, thereby growing $REF_2$ or REOF. These fluorine compounds and oxyfluorides have face-centered cubic crystal structures with a lattice constant of 0.54 to 0.60 nm. Growth of these compounds brings effects of the improvements of residual magnetic flux density, coercive force, squareness of demagnetization curve, thermodemagnetization characteristics, magnetization, anisotropy, corrosion resistance and so on by removing oxygen from the magnetic powder. The metallic and magnetic powders of which at least one forms the high-resistance layer are mixed after the resistance of the magnetic powder is confirmed by measuring the I-V characteristics of the magnetic powder between magnet electrodes. The mixture needs to contain the metallic powder at 10% by volume or more in order to produce a compact having a density of 95% or more by the molding at room temperature (20° C). However, the increase of the molding temperature can decrease the volume fraction of the metallic powder. A fluorine compound can retain a high resistance at the molding temperature of 20 to 1000° C, and shows no deterioration of the magnetic characteristics. It is therefore preferable to an oxide in view of the application. After placing the mixture in a mold, the mixture is molded by pressure with a punch. When producing a rotator of a rotating machine, a mold can give a rotator itself by using rotator material, e.g. steel laminate or iron compact. The magnetic powder can have anisotropy when a magnetic field is applied thereto from the outside before or during the molding step, to produce a rotator of radial or polar anisotropy.

According to the present invention, the molding of a high-resistance magnet at low temperature, including room temperature can be provided.

The embodiments of the present invention are described below.

EXAMPLE 1

NdFeB alloy powders are carried out the treatment of hydrogenation/dehydrogenation to have a powder diameter of about 1 to 1000 μm, and have a coercive force of 12 kOe at room temperature. The procedure for coating the powders (major phase: $Nd_2Fe_{14}B$) with $SiO_2$ to form a high-resistance layer thereon is described below. When a magnetic field is applied to ferromagnetic powders, e.g. NdFeB powders, the ferromagnetic powders are aligned in parallel to the magnetic field direction. The ferromagnetic powders can be moved by changing orientation or intensity of the magnetic field. By moving the ferromagnetic powders within a film-making apparatus, e.g. a sputtering apparatus, atoms jumping out of a target material can be deposited on the surface of the ferromagnetic powders. A coil 101 provided in a film-making apparatus is energized to produce a magnetic field around the coil. Polarity of the magnetic field can be altered by energizing the coil with a high-frequency current, and thus the ferromagnetic powders move by altering polarity of the magnetic field. When a plurality of coils are energized with varying current waveforms, the ferromagnetic powders move from a coil of higher magnetic field intensity to near another coil. These coils can be arranged in parallel to or perpendicular to the target plane. A plurality of the coils 101 are provided on the target side in the sputtering apparatus, and covered with a protective cover 102 of non-magnetic material to protect the coils from a sputtering particle. These coils 101 are energized with varying current waveforms, controlled by an inverter 103 or the like, to produce magnetic fields around the coils. Intensity of the magnetic field is in a range from 1 to 10 kOe. NdFeB powders are placed in a film-making apparatus of a sputtering apparatus, and the coils are energized to collect the ferromagnetic powders. The NdFeB powders are aligned in the magnetic fields along the magnetic field lines to prevent movement of the powders towards an exhaust port while the film-making chamber is evacuated under a vacuum. It is evacuated by a cryopump, an oil diffusing pump, a turbo molecular pump or the like to a vacuum of $1 \times 10^{-4}$ Torr or less, and then an inert gas, e.g. Ar gas, is introduced into the chamber. The chamber is provided with the target in the top site and the coils 101 in the bottom site, and the NdFeB powders are placed in the bottom site. Atoms jump out of the target 106 when it is hit by the Ar ions. When $SiO_2$ is used as the target 106 which is cooled in a cooling chamber 105, the Si and oxygen atoms jump out of the target 106 by an Ar or $Ar/O_2$ mixed gas plasma, and are then deposited on the surface of NdFeB powders on a substrate 104. The substrate is preferably made of the same material as the target 106. When the coils are energized with varying current waveforms, polarity and intensity of the magnetic fields around the coils are altered to deposit $SiO_2$ on the surface of the moving NdFeB powders. The coils 101 are energized with varying current waveforms, where current magnitude is set to apply a magnetic field of 1 to 10 kOe at a frequency of 50 to 100 Hz. The coils arranged at a right angle to the target plane can easily rotate the NdFeB magnetic powders, when energized with varying current waveforms, to uniformly deposit $SiO_2$ on the surface of the NdFeB powders of indefinite or flat shape. The coil surfaces are protected from $SiO_2$ by the protective cover 102 of quartz, and the NdFeB powders move along the magnetic fields outside of the protective cover 102, viewed from the coils. $SiO_2$ can be deposited to have a film thickness of 1 nm to 1000 μm. The NdFeB powders coated with a 100 nm thickness of $SiO_2$ film and Cu powders having a powder diameter of 1 to 100 μm are mixed by a mixer or the like, and the mixture was treated by the compression molding at 1000 MPa and room temperature. The resulting compact has the relative density of about 95% and the resistivity of 1.5 mΩcm at a Cu content of 5%. The resistivity is about 10 times higher than that of the sintered NdFeB magnet, and can reduce a heat generated in the magnet in a high-frequency magnetic field to one-tenth.

After the NdFeB powders (major phase: $Nd_2Fe_{14}B$) was coated with various high-resistance layers (average thickness: 100 nm) by a sputtering or surface treatment, a Cu alloy or Al, was added and mixed, and then the compression molding was carried out under pressure at 50° C or lower and a load of 10 t/cm². Their magnetic characteristics are given in Table 1.

TABLE 1

| Major phase | High-resistance layer | Added metal | Volume fraction of added metal (%) | Resistivity (mΩcm) | Br (T) | iHc (kOe) | BHmax (MGOe) |
|---|---|---|---|---|---|---|---|
| $Nd_2Fe_{14}B$ | No | Cu alloy | 5 | 0.1 | 11.8 | 12.3 | 24.8 |
| $Nd_2Fe_{14}B$ | $SiO_2$ | Cu alloy | 5 | 1.5 | 11.6 | 12.2 | 24.2 |
| $Nd_2Fe_{14}B$ | $Al_2O_3$ | Cu alloy | 10 | 5.5 | 11.3 | 12.4 | 23.7 |
| $Nd_2Fe_{14}B$ | BN | Cu alloy | 5 | 1.2 | 11.5 | 12.4 | 24.3 |
| $Nd_2Fe_{14}B$ | MgO | Cu alloy | 10 | 3.5 | 11.2 | 12.7 | 23.5 |
| $Nd_2Fe_{14}B$ | $CaF_2$ | Cu alloy | 5 | 1.8 | 11.5 | 12.6 | 24.2 |
| $Nd_2Fe_{14}B$ | $CaF_2$ | Cu alloy | 10 | 8.5 | 11.2 | 12.7 | 23.5 |
| $Nd_2Fe_{14}B$ | $CaF_2$ | Al | 1 | 1.1 | 11.7 | 12.4 | 21.3 |
| $Nd_2Fe_{14}B$ | $CaF_2$ | Al | 3 | 3.5 | 11.5 | 12.5 | 24.2 |
| $Nd_2Fe_{14}B$ | $CaF_2$ | Al | 5 | 5.2 | 11.3 | 12.4 | 23.1 |
| $Nd_2Fe_{14}B$ | $CaF_2$ | Al | 10 | 9.5 | 11.1 | 12.4 | 22.4 |
| $Sm_2Co_{17}$ | $SiO_2$ | Cu alloy | 5 | 0.2 | 9.6 | 15.8 | 20.2 |
| $Sm_2Co_{17}$ | $Al_2O_3$ | Cu alloy | 10 | 0.8 | 9.3 | 15.6 | 19.5 |
| $Sm_2Co_{17}$ | BN | Cu alloy | 5 | 0.5 | 9.7 | 15.7 | 20.4 |
| $Sm_2Co_{17}$ | MgO | Cu alloy | 10 | 1.2 | 9.2 | 15.5 | 19.2 |
| $Sm_2Co_{17}$ | $CaF_2$ | Cu alloy | 5 | 1.1 | 9.6 | 15.4 | 20.1 |
| $Sm_2Co_{17}$ | $CaF_2$ | Cu alloy | 10 | 2.5 | 9.1 | 15.7 | 19.1 |
| $Sm_2Co_{17}$ | $CaF_2$ | Al | 1 | 0.6 | 9.8 | 16.2 | 20.5 |
| $Sm_2Co_{17}$ | $CaF_2$ | Al | 3 | 1.8 | 9.5 | 16.5 | 20.1 |
| $Sm_2Co_{17}$ | $CaF_2$ | Al | 5 | 2.9 | 9.4 | 16.8 | 19.8 |
| $Sm_2Co_{17}$ | $CaF_2$ | Al | 10 | 5.4 | 9 | 17.1 | 18.9 |

A compact with high resistance can be produced, even when adding Cu or Al, by forming a high-resistance layer therein. The coercive force (iHc) of it is equivalent to that of a compact without high-resistance layer. It can have a higher coercive force while retaining a high resistance, when produced from a magnetic powder of higher coercive force. The similar tendency is observed with $Sm_2Co_{17}$. In other words, increasing resistance causes no deterioration of coercive force. It is however noted that increasing volume fraction of the metallic powder tends to decrease compact residual magnetic flux density (Br) and energy product (BHmax), and it is necessary to keep the volume fraction of 10% or less in order to obtain a high energy product. The magnet of high resistance shows that temperature dependence of magnetic characteristics is equivalent to that of the magnetic powder used. When used at 150° C or higher, the SmCo-based magnetic powders show lower temperature coefficient of the magnetic characteristics, and thus facilitates magnetic circuit designs.

EXAMPLE 2

SmCo alloy is powders with a powder diameter of about 1 to 1000 μm, and the powders show a coercive force of 16 kOe at room temperature. The procedure for coating the powder (major phase: $Sm_2Co_{17}$) with $CaF_2$ to form a high-resistance layer is described below. When a magnetic field is applied to a ferromagnetic powder, e.g. SmCo powders, the ferromagnetic powders are aligned in parallel to the magnetic field direction. The ferromagnetic powders can be moved by changing orientation or intensity of the magnetic field. By moving the ferromagnetic powders within a film-making apparatus, e.g. sputtering apparatus, atoms jumping out of a target material can be deposited on the surface of the ferromagnetic powders. A coil 101 provided in a film-making apparatus is energized to produce a magnetic field around the coil. Polarity of the magnetic field can be altered by energizing the coil with a high-frequency current, and thus the ferromagnetic powders move by altering polarity of the magnetic field. When a plurality of coils are energized with varying current waveforms, the ferromagnetic powders move from a coil of higher magnetic field intensity to near another coil. These coils can be arranged in parallel to or perpendicular to the $CaF_2$ target plane. A plurality of the coils 101 are provided on the target 106 side in the sputtering apparatus, and covered with a protective cover 102 of non-magnetic material to protect the coils from a sputtering particle. These coils 101 are energized with varying current waveforms, controlled by an inverter 103 or the like, to produce magnetic fields around the coils. Intensity of the magnetic field is in a range from 0.1 to 10 kOe. SmCo powders are placed on a substrate 104 in a film-making apparatus of the sputtering apparatus, and the coils are energized to collect the ferromagnetic powders. The SmCo powders are aligned in magnetic fields along the magnetic field lines to prevent movement of the powders towards an exhaust port while the film-making chamber is evacuated under a vacuum. It is evacuated by a cryopump, an oil diffusing pump, a turbo molecular pump or the like to a vacuum of $1 \times 10^{-4}$ Torr or less, and then an inert gas, e.g. Ar gas, is introduced into the chamber. The chamber is provided with the target in the top region and the coils 101 in the bottom site, and the SmCo powder is placed in the bottom site. Atoms jump out of the target 106 when it is hit by the Ar ions. When $CaF_2$ is used as the target 106, which is cooled in a cooling chamber 105, the Ca and oxygen atoms jump out from the target 106 hit by an Ar or $Ar/N_2$ mixed gas plasma, and are then deposited on the surface of SmCo powders on a substrate 104. The substrate is preferably made of the same material as the target 106, i.e. $CaF_2$. When the coils are energized with varying current waveforms, polarity and intensity of the magnetic fields around the coils are altered to deposit $CaF_2$ on the surface of the moving SmCo powders. The coils 101 are energized with varying current waveforms, where current magnitude is set to apply a magnetic field of 0.1 to 10 kOe at a frequency of 50 to 100 Hz. The coils arranged at a right angle to the target plane can easily rotate the SmCo magnetic powders, when energized with varying current waveforms, to uniformly deposit $CaF_2$ on the surface of the SmCo powders of indefinite or flat shape. The coil surfaces are protected from $CaF_2$ by the protective cover 102 of quartz, and the SmCo powders move along the magnetic fields outside of the protective cover 102, viewed from the coils. $CaF_2$ can be deposited to have a film thickness of 1 nm to 1000 μm. The SmCo powders coated with a 100 nm thickness of $CaF_2$ film and Cu powders having a powder diameter of 1 to 100 μm are mixed and by a mixer or the like, and the mixture was treated by the compression molding at 1000 MPa and room temperature. Molding temperature can be increased to 800° C in order to increase the density of the molded compact. The resulting compact has a relative density of about 95% and the resistivity of 1.1 mΩcm at a Cu content of 5%. The resistivity is about 10 times higher than that of the sintered SmCo magnet, and can reduce a heat generated in the magnet in a high-frequency magnetic field to one-tenth.

EXAMPLE 3

Figure 3:
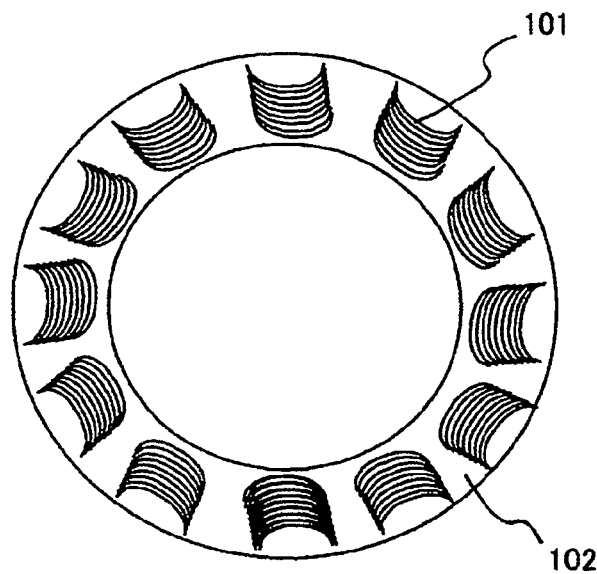
FIG. 3 illustrates a coil arrangement in a sputtering apparatus.
Figure 4:
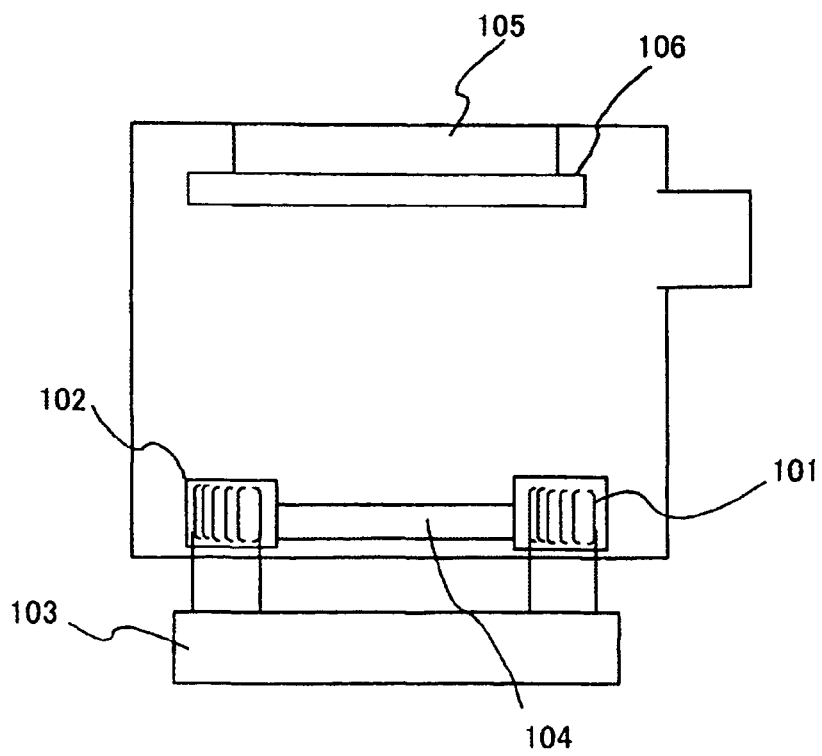
FIG. 4 outlines a sputtering apparatus.

NdFeB alloy powders are treated by rapid cooling to have a powder diameter of about 1 to 1000 μm, and a coercive force of 10 kOe at room temperature. The procedure for coating the powders (major phase: $Nd_2Fe_{14}B$) with $CaF_2$ to form a high-resistance layer is described below. When a magnetic field is applied to ferromagnetic powders, e.g. NdFeB powders, the ferromagnetic powders are aligned in parallel to the magnetic field direction. The ferromagnetic powders can be moved by changing orientation or intensity of the magnetic field. By moving the ferromagnetic powders within a film-making apparatus, e.g. sputtering apparatus, atoms jumping out of a target material can be deposited on the surface of the ferromagnetic powders. A coil 101 provided in a film-making apparatus is energized to produce a magnetic field around the coil. Polarity of the magnetic field can be altered by energizing the coil with a high-frequency current, and thus the ferromagnetic powers move by altering polarity of the magnetic field. When a plurality of coils are energized with varying current waveforms, the ferromagnetic powders move from a coil of higher magnetic field intensity to near another coil. These coils can be arranged in parallel to or perpendicular to the target plane. A plurality of the coils 101 are provided on the target 106 side in the sputtering apparatus, and covered with a protective cover 102 of non-magnetic material to protect the coils from a sputtering particle. These coils 101 are energized with varying current waveforms, controlled by an inverter 103 or the like, to produce magnetic fields around the coils. Intensity of the magnetic field is in a range from 1 to 10 kOe. NdFeB powders are placed in the sputtering apparatus as a film-making apparatus, and the coils are energized to collect the ferromagnetic powders. The NdFeB powders are aligned in magnetic fields along the magnetic field lines to prevent movement of the powders towards an exhaust port while the film-making chamber is evacuated under a vacuum. It is evacuated by a cryopump, an oil diffusing pump, a turbo molecular pump or the like to a vacuum of $1 \times 10^{-4}$ Torr or less, and then an inert gas, e.g. Ar gas, is introduced into the chamber. The chamber is provided with the target in the top region and the coils 101 in the bottom site, and the NdFeB powders are placed in the bottom site. Atoms jump out of the target 106 when it is hit by the Ar ions. When $CaF_2$ is used as the target 106 which is cooled in a cooling chamber 105, the Ca and oxygen atoms jump out of the target 106 by an Ar or $Ar/N_2$ mixed gas plasma, and are then deposited on the surface of NdFeB powders on a substrate 104. The substrate is preferably made of the same material as the target 106, i.e. $CaF_2$. When the coils are energized with varying current waveforms, polarity and intensity of the magnetic fields around the coils are altered to deposit $CaF_2$ on the surface of the moving NdFeB powders. The coils 101 are energized with varying current waveforms, where current magnitude is set to apply a magnetic field of 1 to 10 kOe at a frequency of 50 to 100 Hz. The coils arranged at a right angle to the target plane can easily rotate the NdFeB magnetic powders, when energized with varying current waveforms, to uniformly deposit $CaF_2$ on the surface of the NdFeB powders of indefinite or flat shape. The coil surfaces are protected from $CaF_2$ by the protective cover 102 of quartz, and the NdFeB powders move along the magnetic fields outside of the protective cover 102, viewed from the coils. $CaF_2$ can be deposited to have a film thickness of 1 nm to 1000 μm. Then, a $CaF_2$ is deposited on the surface of Fe powder by the similar procedure. The Fe powders have a smaller average diameter than the NdFeB grains to obtain the improvements of a density and a mechanical strength. Fe-based magnetic powder, e.g. Fe—Si, Fe—C, FeCo alloy or Fe—Ni alloy, is used as the Fe powder. These alloy powders show ferromagnetism at room temperature. It is possible to deposit a material close to a target material on the surface of the powders showing ferromagnetism at room temperature by the apparatus illustrated in FIGS. 3 and 4. By molding a mixture of the Fe and NdFeB powders at room temperature, a composite material of soft and hard magnetisms can be produced. When carrying out the compression molding at 100 MPa or more, the mixture containing the Fe powder at 1% or more can be densified to have a relative density of 90% or more. Such a high density cannot be achieved with the mixture containing the Fe powder at below 1% by volume. In the case the heating is carried out at the time of a compression molding, the deformation of the NdFeB easily occurs. As a result, the power with a relative density of 95% or more at a reduced Fe powder content can be obtained. The resulting compact has the resistivity of 0.5 mΩcm or more and the coercive force equivalent to that of the magnetic powder of NdFeB used. The upper limit of the molding temperature is 1000° C because the fluorine compound formed on the surface of the powders reacts with NdFeB at a higher temperature than 1000° C and thus it is difficult to simultaneously obtain desired resistance and magnetic characteristics even when a high density is achieved.

EXAMPLE 4

Example 4 describes another embodiment, specifically a procedure for molding NdFeB powders including a binder wherein the binder is prepared by forming a fluorine compound on a surface of Fe powders having a powder diameter of 1 to 100 μm using a surface treatment.

A coating solution for a dysprosium fluoride film was prepared by the following procedure.

(1) First, 4 g of dysprosium acetate or nitrate as a highly water-soluble salt is completely dissolved in about 100 mL of water by a shaker or supersonic stirrer.
(2) Hydrofluoric acid diluted to about 10% was slowly added to the above solution in an equivalent quantity for the chemical reaction to produce $DyF_3$.
(3) The resulting solution with solution-like precipitate $DyF_3$ was stirred for 1 hour or more by a supersonic stirrer.
(4) The solution was centrifugally treated at 4,000 rpm, the supernatant solution was removed, and then almost the same quantity of methanol was added.
(5) The methanol solution containing the gelled $DyF_3$ was stirred to completely disperse $DyF_3$ and then stirred by a supersonic stirrer for 1 hour or more.
(6) The steps (4) and (5) were repeated 4 times until no negative ion of acetate, nitrate or the like was detected.

(7) A sol with slightly suspended $DyF_3$ resulted. The treatment solution used was methanol containing $DyF_3$ of 1 g/15 ml.

The magnetic powders used were Fe alloy powders of Fe—Si, Fe—Co, Fe—Al, Fe—C and Fe—M-semimetal (M: transition metal element, and semimetal: selected from the group consisting of Si, B, Al, Ga and P). The magnetic powder for a rare-earth magnet was coated with a film of a rare-earth or alkali-earth fluoride by the following process.

(1) In the case of an average powder diameter of 10 μm, a $DyF_3$-containing coating solution was added to the Fe alloy powder at 15 mL/100 g of the powder, and mixing-treated until the grains were confirmed to be wetted by the solution.

(2) The Fe alloy powder, treated with the $DyF_3$-containing coating solution in the step (1), was treated under a vacuum of 2 to 5 Torr to remove methanol as a solvent.

(3) The Fe alloy powder, treated in the step (2), was put in a quartz boat and heat-treated under a vacuum of $1 \times 10^{-5}$ Torr at 200° C for 30 minutes and then at 400° C for 30 minutes.

(4) The magnetic powder, heat-treated in the step (3), was put in a container and heat-treated under a vacuum of $1 \times 10^{-5}$ Torr at 400 to 800° C.

(5) The Fe alloy powder, heat-treated in the step (4), was analyzed for its magnetic characteristics.

The Fe powder coated with $DyF_3$ by the above procedure was heat-treated at 400° C for 30 minutes to 1 hour to grow $DyF_3$ in the vicinity of the interface. By molding a mixture of the prepared Fe powder and NdFeB powder at room temperature, a composite material of soft and hard magnetisms can be produced. When carrying out the compression molding at 100 MPa or more, the mixture containing the Fe powder at 1% or more by volume can be densified to have a relative density of 90% or more. Such a high density cannot be achieved with the mixture containing the Fe powder at below 1% by weight. In the case the heating is carried out at the time of a compression molding, the deformation of the NdFeB easily occurs. As a result, the powder with a relative density of 95% or more at a reduced Fe powder content can be obtained. The resulting compact has the resistivity of 0.5 mΩcm or more and the coercive force equivalent to that of the magnetic powder of NdFeB used. The upper limit of the molding temperature is 1000° C because the fluorine compound formed on the surface of the powder reacts with NdFeB at a higher temperature than 1000° C and thus it is difficult to simultaneously obtain desired resistance and magnetic characteristics even when a high density is achieved.

EXAMPLE 5

FIG. 1 is a radial cross-sectional view illustrating a motor which uses the high-resistance magnet of the present invention. Referring to FIG. 1, a motor stator 2 has a stator iron core 6 having teeth 4 and a core back 5, and armature wiring 8 (U-phase wiring 8a, V-phase wiring 8b and W-phase wiring 8c of 3-phase wiring) in a slot 7 provided between teeth 4, wherein the armature wiring 8 is wound in a concentrated manner to surround the teeth 4 for a motor. Since the motor which uses the high-resistance magnet has a quadrupole with 6-slot structure, the slot pitch is 120° electrical angle. A rotator is inserted into a shaft hole 9 or rotator hole 10, and a permanent magnet 1 is provided around a rotator shaft 3. The stator is made of amorphous FeSiB (METGLAS2605TCA, Honeywell) with about 25 μm thickness, wherein the amorphous FeSiB was punched into a thin band which is coated with resin and pressed to increase lamination factor. The amorphous laminate had a saturation magnetic flux density of 1.25 T at a lamination factor of 80%. It is confirmed that the stator 2 of amorphous FeSiB has a higher efficiency than that of silicon steel plate (thickness: 0.15 μm) at a high speed of 1,000 rpm or more because of the former's low hysteresis loss and eddy current loss. Therefore, it is suitable for motors for home electric appliances (e.g. air conditioners) and power generators for dispersed power sources, and HEV-driven motors, which need a high-efficiency motor. The high-resistance magnet has the resistivity of 0.2 to 100 mΩcm, and is composed of a magnetic powder of NdFeB, treated with a solution or by a sputtering apparatus to be partly insulated by a layer containing a fluorine compound. The fluorine compound includes at least one species selected from those containing a rare-earth or alkali-earth element, e.g. $MgF_2$, $CeF_2$, $PrF_3$, $NdF_3$, $SmF_3$, $GdF_3$, $TdF_3$, $DyF_3$, $HoF_3$, $ZrF_4$, $HfF_4YbF_3$ and $YF_3$. The fluorine compound incorporated with oxygen, carbon or nitrogen can be also used as the insulation layer so long as its insulation capacity is not greatly deteriorated. The magnet is produced by pressing at room temperature with 10% of a Cu alloy powder as a binder material. This magnet can have a monolithic structure with the rotator shaft 3 when produced in a mold which partly uses the shaft. The resulting magnet of high resistance can reduce eddy current loss of the motor.

EXAMPLE 6

Figure 2:
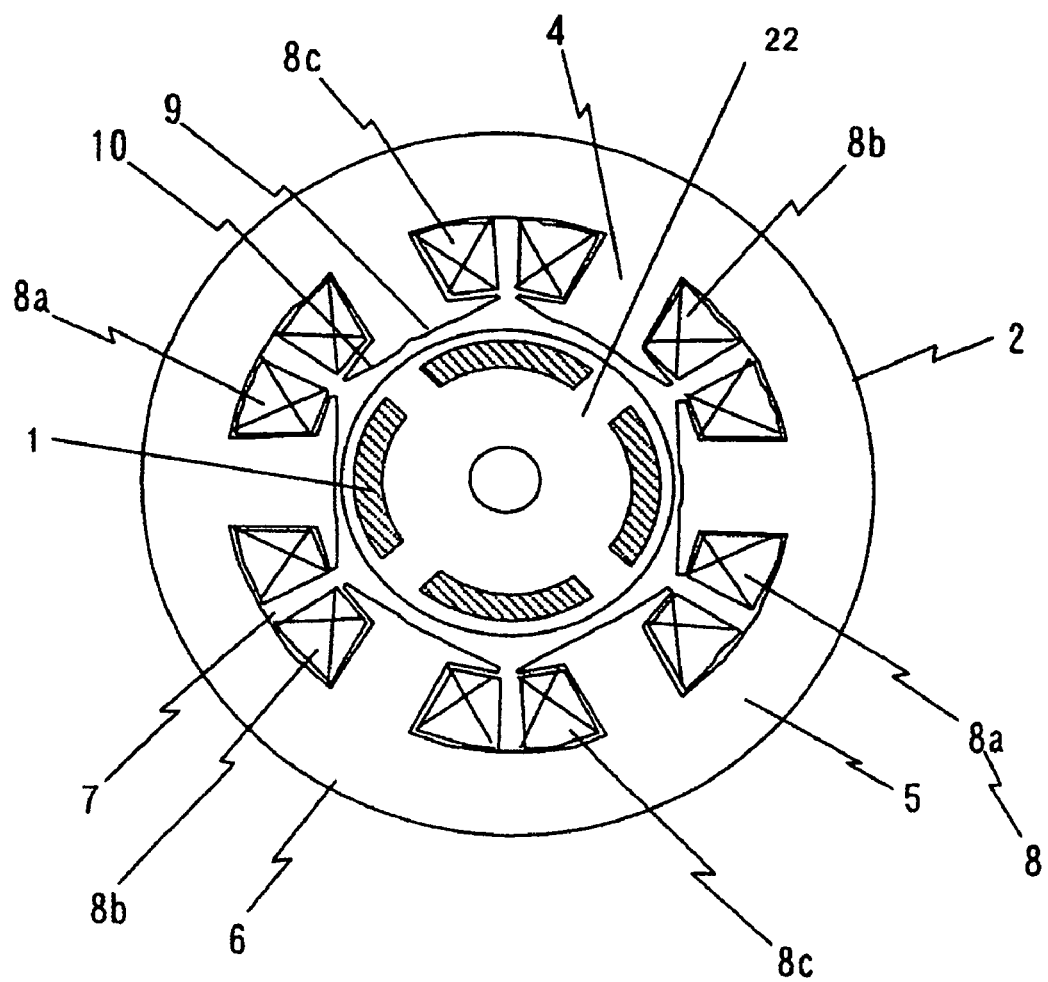
FIG. 2 is a radial cross-sectional view illustrating another motor of powdered-iron magnet.

Referring to FIG. 2, a stator 2 for a motor which uses a powdered-iron magnet has a stator iron core 6 having teeth 4 and a core back 5, and armature wiring 8 (U-phase wiring 8a, V-phase wiring 8b and W-phase wiring 8c of 3-phase wiring) in a slot 7 provided between teeth 4, wherein the armature wiring 8 is wound in a concentrated manner to surround the teeth 4. Since the motor which uses the high-resistance magnet has a quadrupole with 6-slot structure, the slot pitch is 120° electrical angle. A rotator is inserted into a shaft hole 9 or rotator hole 10, and a permanent magnet 1 is provided around a rotator shaft 3. In FIG. 2, a silicon steel plate (or electromagnetic steel plate) is used for the stator, and a laminate punched out of a silicon steel plate is used for the stator iron core 6. A rotator is surrounded by permanent magnets arranged to form a ring. A rotator shaft 22 is a ferrous material, and the permanent magnet 1 is radially anisotropic. Both the stator iron core 6 and permanent magnet 1 can be produced by compaction, possibly into a three-dimensional shape. The motor with a powdered high-resistance magnet, as shown in FIG. 2, can reduce eddy current loss at the permanent magnet 1. It is therefore advantageous for increasing torque because it can reduce the loss even when a high magnetic flux is generated in a gap between the rotator and stator. The magnetic flux in the gap can be changed by changing energy product of the permanent magnet 1. The magnet of high resistance was compared with a common sintered magnet with respect to the loss. The loss-reducing effect was observed at a magnetic flux density of 0.2 T or more, and the magnet of high resistance exhibited a higher loss reduction rate as magnetic flux density increased. The permanent magnet had a resistivity of 1.5 mΩcm. The loss can be further reduced by increasing resistance. The loss reducing effect is more noted as number of poles or slots increases.

It should be further understood by those skilled in the art that although the foregoing description has been made on embodiments of the invention, the invention is not limited thereto and various changes and modifications may be made without departing from the spirit of the invention and the scope of the appended claims.

The present invention can work in a high-frequency magnetic field while controlling loss of an RE-Fe—B or RE-Co magnet (RE: rare-earth element) and is useful for motor magnet which realizes a high torque. The motor which uses the magnet can be used for driving hybrid vehicles, starters and power steerings.

The invention claimed is:

1. A magnet comprising magnetic powders, metallic powders having a lower hardness than the magnetic powders and a high electrical resistance layer comprising a fluorine compound containing at least one rare earth metal and having a face-centered cubic crystal structure coated on at least one of the magnetic powders and the metallic powders, wherein the magnetic powders occupy a larger volume than the metallic powders.

2. The magnet according to claim 1, wherein a thickness of the high-resistance layer is 1 to 100 nm.

3. The magnet according to claim 1, wherein the high electrical resistance layer is coated on the magnetic powders.

4. The magnet according to claim 1, wherein the metallic powders have a smaller average powder diameter than the magnetic powders.

5. The magnet according to claim 1 wherein an electrical resistance between the magnetic powders is increased by the high electrical resistance layer.

6. The magnet according to claim 1, wherein the metallic powders work as a binder for the binding between the magnetic powders.

7. A rotating machine comprising a rotator, a stator and a winding, wherein a magnetic field generated around the winding passes through the rotator and the stator, and the rotator comprises the magnet according to claim 1.

8. A magnetic circuit or rotating machine comprising the magnet according to claim 1 to make eddy current loss reduced.

9. A magnet produced by molding a mixture of magnetic powders, metallic powders having a lower hardness than the magnetic powders and a high electrical resistance layer comprising a fluorine compound containing at least one rare earth metal and having a face-centered cubic crystal structure coated on at least one of the magnetic powders and the metallic powders.

10. The magnet according to claim 9 which comprises the metallic powders of 1 to 50% by volume.

11. The magnet according to claim 9, wherein the high electrical resistance layer has a thickness of 1 to 100 nm.

12. The magnet according to claim 9, wherein the high electrical resistance layer is placed between the magnetic powders and the metallic powders.

13. The magnet according to claim 9, wherein the metallic powders have a smaller average powder diameter than the magnetic powders.

14. The magnet according to claim 9 wherein an electrical resistance between the magnetic powders is increased by the high electrical resistance layer.

15. The magnet according to claim 9, wherein the metallic powders work as a binder for the binding between the magnetic powders.

16. The magnet according to claim 9 which is produced by a compression molding by deformation of the metallic powders.

17. A rotating machine comprising a rotator, a stator and a winding, wherein a magnetic field generated around the winding passes through the rotator and the stator, and the rotator comprises the magnet according to claim 9.

18. A magnetic circuit or rotating machine comprising the magnet according to claim 9 to make eddy current loss reduced.

19. A compression molded magnet produced by forming a high electrical resistance layer comprising a fluorine compound containing at least one rare earth metal on a surface of metallic powders; mixing the metallic powders and magnetic powders, wherein the metallic powders have a lower hardness than the magnetic powders; and applying an external load on the mixture of the metallic powders and the magnetic powders to deform the metallic powders.

20. The magnet according to claim 1, wherein the high electrical resistance layer is coated on the metallic powders.

21. The magnet according to claim 1, wherein the high electrical resistance layer is coated on the magnetic powders and the metallic powders.

* * * * *